United States Patent [19]

Gangneux

[11] 4,002,591
[45] Jan. 11, 1977

[54] COLORATION OF LINEAR POLYMERS BY CO-POLYCONDENSATION WITH PIGMENTS

[75] Inventor: Philippe Yves Edouard Gangneux, Bihorel, France

[73] Assignee: Produits Chimiques Ugine Kuhlmann, Paris, France

[22] Filed: Feb. 7, 1973

[21] Appl. No.: 330,332

[30] Foreign Application Priority Data

Feb. 7, 1972 France .............................. 72.03976

[52] U.S. Cl. .......................... 260/37 N; 260/78 TF
[51] Int. Cl.² ........................................ C08K 5/34
[58] Field of Search ............ 260/37 N, 281, 326 C; 8/DIG. 7, 326 R, 78 R, 77.5 CH, 78 TF

[56] References Cited

UNITED STATES PATENTS

| | | | |
|---|---|---|---|
| 2,660,574 | 11/1953 | Jones | 260/37 NP |
| 2,668,815 | 2/1954 | Nawiasky | 260/281 |
| 3,006,882 | 10/1961 | Alternatt | 260/37 |
| 3,049,518 | 8/1962 | Stephens | 260/78 R |
| 3,137,671 | 6/1964 | Bosshard | 260/37 N |
| 3,304,310 | 2/1967 | Hari | 260/281 |
| 3,337,288 | 8/1967 | Horiguchi | 260/281 X |
| 3,396,172 | 8/1968 | Braun | 260/326 C |
| 3,515,732 | 6/1970 | Staeuble | 260/281 |
| 3,554,776 | 1/1971 | Gerson | 260/281 X |
| 3,658,747 | 4/1972 | Kolyer | 260/37 N |
| 3,714,131 | 1/1973 | Hoback | 260/78 TF |
| 3,730,950 | 5/1973 | Barnes | 260/37 N |
| 3,778,411 | 12/1973 | Emerick | 260/78 TF |
| 3,809,670 | 5/1974 | Costain | 260/37 N |
| 3,817,926 | 6/1974 | Pauze | 260/78 TF |
| 3,882,085 | 5/1975 | Schmitt | 260/78 TF |

FOREIGN PATENTS OR APPLICATIONS

| | | |
|---|---|---|
| 986,556 | 3/1965 | United Kingdom |
| 1,056,299 | 1/1967 | United Kingdom |

*Primary Examiner*—Paul R. Michl
*Attorney, Agent, or Firm*—Beveridge, DeGrandi, Kline, Lunsford

[57] ABSTRACT

Process for the coloration of a linear polymer which comprises effecting the polycondensation of the monomer in the presence of a pigment of the polycyclic polycarboximide series containing two primary amine or haloformyl functional groups and copolycondensates obtained by this process.

4 Claims, No Drawings

COLORATION OF LINEAR POLYMERS BY CO-POLYCONDENSATION WITH PIGMENTS

The invention relates to the colouration of linear polymers, especially polyamides, by means of pigments copolycondensed in the polymer chain.

The linear polyamides may be obtained for example by several processes, for example, polycondensation of a monoamino-monocarboxylic acid or of the corresponding lactam, polycondensation of a diamine and a diacid in equimolecular proportions, polycondensation of the salt resulting from the reaction of a diamine and a diacid. In the starting materials the two functional groups are separated by at least two carbon atoms.

It is known to use dyestuffs containing reactive groups in order to colour bulk fibres based on polyamides. These groups partially fix the dyestuff on the polymer formed or on the polymer in the course of formation.

When the dyestuffs have only one function capable of reacting with an amino or carboxy group of the polymer during its formation, the fixation of the dyestuff may stop the process of polycondensation on the end of the chain. When the dyestuffs have three or more groups capable of reacting, the polycondensation gives rise to a network system which may be polydimensional.

By means of the present invention these modifications of the polycondensation process may be avoided and linear polyamides produced in which the dyestuff material forms part of the polycondensed chain.

According to the present invention a process for the colouration of a linear polymer is provided which comprises effecting the polycondensation of the monomer in the presence of a pigment of the polycyclic polycarboximides series containing two primary amine or haloformyl functional groups.

Of these pigments those of the following general formula may be particularly mentioned:

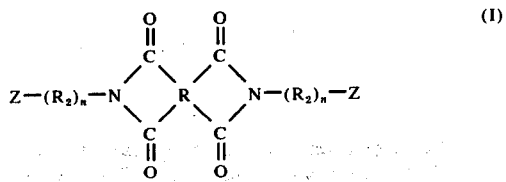

(I)

wherein R represents the tetravalent residue of a substituted or unsubstituted mono- or poly-cyclic aromatic hydrocarbon or the tetravalent residue of a substituted or unsubstituted perinone, $n$ represents 0 or 1, $R_2$ represents a substituted or unsubstituted aliphatic, aromatic or heterocyclic radical, and Z represents a primary amine group, a haloformyl group, or a radical of the general formula:

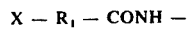

wherein X represents a primary amine or haloformyl group and $R_1$ represents a substituted or unsubstituted aliphatic, aromatic or heterocyclic radical.

Examples of substituents of R are halogen atoms or nitro, hydroxy, or alkoxy groups and examples of substituents of $R_2$ are halogen atoms or nitro, alkyl or alkoxy groups.

According to the invention, hydrocarbons comprising the benzenic, naphtalenic, anthracenic, phenanthrenic, naphtacenic or perylenic nucleus are aromatic hydrocarbons, for instance benzophenone is a aromatic hydrocarbon.

Aliphatic radicals more particularly involve linear hydrocarbons having from 1 to 10 carbon atoms. Alkyl or alkoxy groups preferably comprise from 1 to 5 carbon atoms.

As $R_1$ or $R_2$ are considered, possible heterocycles are for for instance 2,6-benzobisthiazoldiyl, 2,7-benzobisthiazoldiyl, 2,6-[9,10-dichlorotriphenodioxazindiyl]. The radical R may bear up to 4 constituents and preferably 2, $R_1$ may have up to 4 and $R_2$ up to 6 substituents.

The pigments obtained by reacting the compounds of formula (I) in which Z represents a haloformyl group or a Hal—CO—$R_1$—CONH—group with any diamine or a N,N-diamino-R-bis(dicarboximide) are also suitable for carrying out the process of the invention. Further, the pigments obtained by reacting the compounds of formula (I), in which Z represents a primary amine group or a $H_2N$—$R_1$—CONH— group, with a compound of the formula Hal—CO—$R_1$—CO-Hal or a diacid may be used.

Such pigments are described in my patent applications of the same day for "Amino-imide pigments" United States Patent Application Ser. No. 330,345, filed Feb. 7, 1973, "Pigmentary imidoperionones", United States Patent Application Ser. No. 330,331, filed Feb. 7, 1973 and "Pigments derived from carboxamidopolyimides", U.S. Patent Application Ser. No. 330,344, filed Feb. 7, 1973.

The pigments of formula (I) and those obtained reacting the compounds of formula (I) in which Z represents a haloformyl group or a Hal—CO—$R_1$—CONH— group with any diamine or a N,N-diamino-R-bis (dicarboximide) and also those obtained by reacting the compounds of formula (I) in which Z represents a primary amino group or a $H_2N$—$R_1$—CONH— group with a compound of the formula Hal—CO—$R_1$—CO—Hal, are stable at high temperature, insoluble in the usual organic solvents, slightly soluble in concentrated sulphuric acid, but soluble in the monomers in the molten state.

The preferred monoamino-monocarboxylic acid used for the copolycondensation is 11-aminoundecanoic acid; Σ-coprolactam; the preferred diamines are p-phenylenediamine, decamethylene-diamine and hexamethylenediamine, and the preferred diacids are terephthalic, isophthalic, adipic and sebacic acids.

In order to carry out the process according to the invention, the monomers and dyestuffs are mixed and the copolycondensation is effected by the usual processes for the preparation of polymers. The proportions of the dyestuff may vary from 1‰ (i.e. 1 per 1000) to 2‰ of the weight of the monomer.

The introduction of dyestuff characteristics into the polymer chains modifies the viscosity and the molar mass of the polymers. These modifications are variable according to the pigments used and the optimal amounts of pigment may be determined experimentally.

The copolycondensates may be spun according to the usual techniques. Microscopic examination of the fibres shows that the colouration is perfectly homogeneous. On the other hand, it has proved impossible to separate the dyestuff and the polymer by extraction with solvents for the polymers such as formic acid or metacresol in the case of polyamides. Finally, the viscosity measurements carried out on the solutions in formic acid of polymers obtained by introducing variable percentages of dyestuff monomers show that there is indeed polycondensation. The examination of the viscosity curves for the coloured polymers in the molten state leads to the same conclusion.

In the following Examples, which are purely illustrative, the parts are parts by weight.

EXAMPLE 1

49.95 parts of hexamethylene-ammonium adipate are intimately mixed with 0.05 parts of an equimolecular mixture of N,N'-bis(4-amino-phenyl)-3,4,9,10-bis(-dicarboximide) perylene and adipic acid. The composition is introduced into an autoclave, which is closed and purged with nitrogen. The temperature is raised to 180° C. over a period of one hour and maintained at this temperature for half an hour. After decompression, the autoclave is scavenged with nitrogen and heated to 280° C. and maintained at this temperature for 2 and a half hours. The autoclave is decompressed and allowed to cool while being maintained under an atomosphere of nitrogen. The polymer thus obtained has an intrinsic viscosity in formic acid of 1.42 (solution of 1 g of polymer in 100 c.c. of 75% formic acid was measured at 25° C. It is impossible to extract the dyestuff from the polymer.

EXAMPLE 2

One operates as in Example 1, but 0.05 parts of acetic are added to the mixture. A spinnable polymer is obtained which has good properties. The threads obtained are red.

EXAMPLE 3

One operates as in Example 2, but the diamine of Example 1 is replaced by N,N'-bis(4-amino-bis-phenyl)3,4-9,10-bis(dicarboximide) perylene. Brown filaments are obtained.

EXAMPLE 4

200 parts of water, 1.6 parts of sodium hydroxide, 0.5 parts of sodium laurylsulphate, 2.26 parts of hexamethylenediamine and 0.02 parts of N,N'-bis(4-amino-2-nitro- or 3-phenyl) 1,8-4,3-bis(dicarboximide) naphthalene are introduced with vigorous stirring into an apparatus provided with a stirring device. Vigorous stirring is effected at the ambient temperature for 2 minutes, then a solution of 3.66 parts of adipoyl dichloride in 100 parts of tetrachloroethylene is introduced over a period of 15 seconds, and the mixture is maintained at the ambient temperature for two and a half minutes while stirring. The product is filtered off and washed to remove mineral products. A copolyamide is thus obtained from which it is impossible to separate the constituents and which gives yellow filaments.

EXAMPLE 5

One operates as in Example 4, but on the one hand, the hexamethylenediamine is replaced by 2.10 parts of paraphenylenediamine and, on the other hand, the adipoyl dichloride is replaced by 4.06 parts of terephthaloyl dichloride. A yellow copolyamide is obtained.

EXAMPLE 6

95 parts of ε-caprolactone, 4.8 parts of hexamethyleneammonium adipate and 0.2 parts of the mixture consisting of the cis form of the dyestuff of formula:

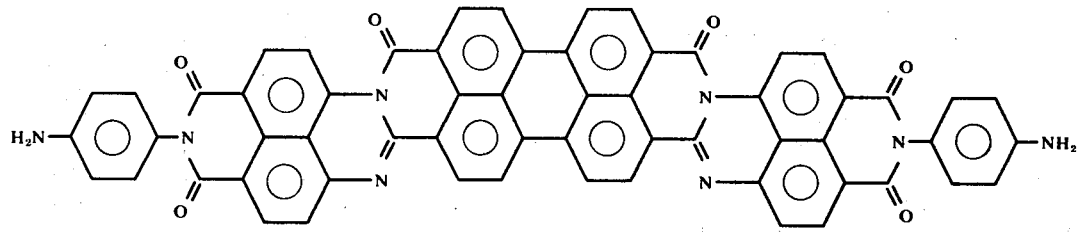

and the trans form of the same perinone, are heated to 265° C. in an inert atmosphere. This temperature is maintained for 6 to 8 hours and the mixture is kept under vacuum for about 30 minutes under 1 mm/Hg. The copolycondensate obtained gives blue filaments.

EXAMPLE 7

A mixture composed of 99.9 parts of 11-aminoundecanoic acid and 0.1 parts of the dyestuff of Example 6 (mixture of the cis and trans forms) is heated to 205° C. When water vapour is no longer evolved, the product is maintained for about 30 minutes under a vacuum of 1 mm/Hg. A blue copolycondensate is obtained.

EXAMPLE 8

One operates as in Example 1, but 49.95 parts of hexamethylene-ammonium sebacate and 0.05 parts of an equimolecular mixture of sebacic acid and of the dyestuff consisting of the mixture of the cis form of formula:

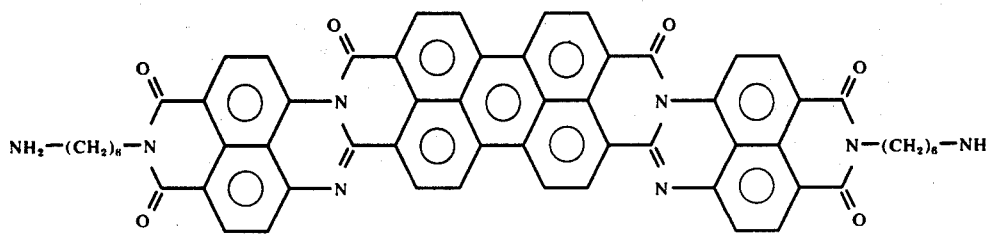

and the trans form of the same perinone are used.

A polymer is obtained which has an intrinsic viscosity in sulphuric acid of 0.90 (solution of 1 g of polymer in 100 c.c. of 96% $H_2SO_4$ - measured at 25° C.).

EXAMPLE 9

One operates as in Example 4, but 220 parts of water, 0.82 parts of sodium hydroxide, 0.1 parts of sodium laurylsulphate, 1.16 parts of hexamethylenediamine, and 0.01 parts of N,N'-bis-aminoperylene-bis 3,4-9,10-dicarboximide) are used. The organic phase consists of 2.39 parts of sebacoyl dichloride in 150 parts of tetrachloroethylene.

A copolyamide of rose colour is obtained.

I claim:

1. Process for forming a colored linear polyamide which comprises effecting the polycondensation of a monomer or monomers of the polyamide in the presence of a pigment of the polycyclic dicarboximide series containing two primary amine functional groups, wherein the pigment has the formula:

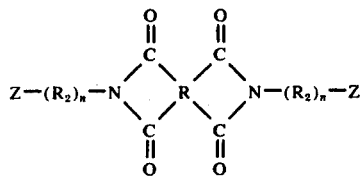

wherein R represents a tetravalent residue of a substituted or unsubstituted mono- or poly-cyclic aromatic hydrocarbon or the tetravalent residue of a substituted or unsubstituted perinone; $n$ represents 0 or 1; $R_2$ represents a $C_1 - C_{10}$ aliphatic, phenyl or diphenyl radical; and Z represents a primary amine group; wherein said pigment is in an amount of from 1 part per 1000 to 2 parts per hundred parts by weight of said monomer or monomers; and wherein said monomer or monomers are selected from the group consisting of 11-aminoundecanoic acid, Σ-caprolactam, and p-phenylenediamine, decamethylenediamine or hexamethylenediamine together with terephthalic, isophthalic, adipic or sebacic acid.

2. A polycondensate comprising a linear polyamide which is the reaction product of (a) a compound of the formula (I):

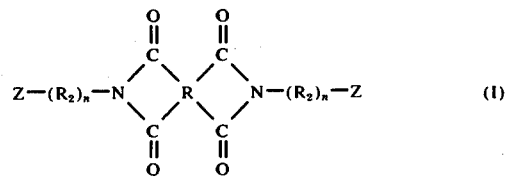

wherein R represents the tetravalent residue of a substituted or unsubstituted mono- or poly-cyclic aromatic hydrocarbon or the tetravalent residue of a substituted or unsubstituted perinone, $n$ represents 0 or 1, $R_2$ represents a $C_1 - C_{10}$ aliphatic, phenyl or diphenyl radical, and Z represents a primary amine group; and (b) a monomer or monomers of said polyamide, said monomer or monomers selected from the group consisting of 11-aminoundecanoic acid, Σ-caprolactam, and p-phenylenediamine, decamethylenediamine or hexamethylenediamine together with terephthalic, isophthalic, adipic or sebacic acid; wherein said polyamide comprises 1 part per 1000 to 2 parts by weight of said compound of formula (I).

3. A process according to claim 1 wherein the proportion of pigment is from 1 part per 1000 to 4 parts per 1000 parts by weight of the monomer or monomers.

4. The copolycondensate obtained according to the process claimed in claim 1.

* * * * *